United States Patent [19]
Arsenault

[11] Patent Number: 5,641,213
[45] Date of Patent: Jun. 24, 1997

[54] TRACTION DEVICE FOR WHEELED VEHICLE

[76] Inventor: Armand Joseph Arsenault, 7640 Diamond Crescent, Sardis, British Columbia, Canada, V2R 3A8

[21] Appl. No.: 491,455

[22] Filed: Jun. 16, 1995

Related U.S. Application Data

[63] Continuation-in-part of Ser. No. 236,922, May 2, 1994, abandoned.

[51] Int. Cl.$^6$ ................................................. B62D 55/205
[52] U.S. Cl. ........................... 305/40; 305/186; 305/196
[58] Field of Search ............................. 305/40, 185, 186, 305/196, 198

[56] References Cited

U.S. PATENT DOCUMENTS

| | | | |
|---|---|---|---|
| 1,360,115 | 11/1920 | Kemper . | |
| 1,446,870 | 2/1923 | Borst, Jr. . | |
| 2,124,708 | 7/1938 | Peter | 180/9.1 |
| 3,801,164 | 4/1974 | Mazzarins | 305/23 |
| 4,232,753 | 11/1980 | Carlson | 180/9.2 |
| 4,303,278 | 12/1981 | Fehling | 305/35 |
| 4,620,602 | 11/1986 | Capriotti | 180/9.21 |
| 4,810,043 | 3/1989 | McIntosh | 305/15 |
| 4,923,257 | 5/1990 | Purcell | 305/29 |
| 5,076,378 | 12/1991 | Lagacé | 180/9.1 |
| 5,113,958 | 5/1992 | Holden | 180/9.4 |

FOREIGN PATENT DOCUMENTS

| | | | |
|---|---|---|---|
| 7802767 | 4/1979 | U.S.S.R. | 305/40 |
| 411083 | 9/1932 | United Kingdom | 305/39 |

OTHER PUBLICATIONS

Loegering Tire Crawlers Brochure date Jan. 1993.
Goodyear Track Mounting Procedures for Skid Steer Rubber Track Instruction sheets dated 1993.
Ritchie Bros. Auctioneers Public Auction Pamphlet dated 12 Oct. 1994.
Proven Performance Bobcatalogue pp. 25 and 26 dated 1995.
Olofsfors AB Wheel Track Technical Data pamphlet (undated).
974/975 Loader Service Manual (Melroe Tracks), pp. 1–23, 1–24 dated Jun. 1979.

*Primary Examiner*—Russell D. Stormer
*Attorney, Agent, or Firm*—Bull, Housser & Tupper

[57] ABSTRACT

The rubber tire traction device comprises two lengths of transversely spaced apart link chains and a plurality of cross members extending between the chains. Each cross member has a central portion to contact a tire tread portion and a pair of end portions, each of which has at least one tongue which is secured to a particular single link. In one embodiment, each end portion of the cross member has a second tongue to provide with the first tongue a pair of outwardly extending tongues, a recess being located between the tongues. One side portion and portions of generally arcuate end portions of the particular single link are secured to edges of the recess. Adjacent links interconnecting the particular link also enclose reinforced portions of the particular link and tongue secured together with sufficient clearance to permit hinging thereabouts. In alternative embodiments, the tongue of each end portion has a width defined by space between side edges of the tongue, and a thickness which permits the tongue to be fitted between and secured to side portions of the particular link. The tongue is positioned in the particular link to provide clearance between the tongue and the arcuate end portions of the particular link so that adjacent links interconnected directly to the particular link can swing thereabouts.

26 Claims, 5 Drawing Sheets

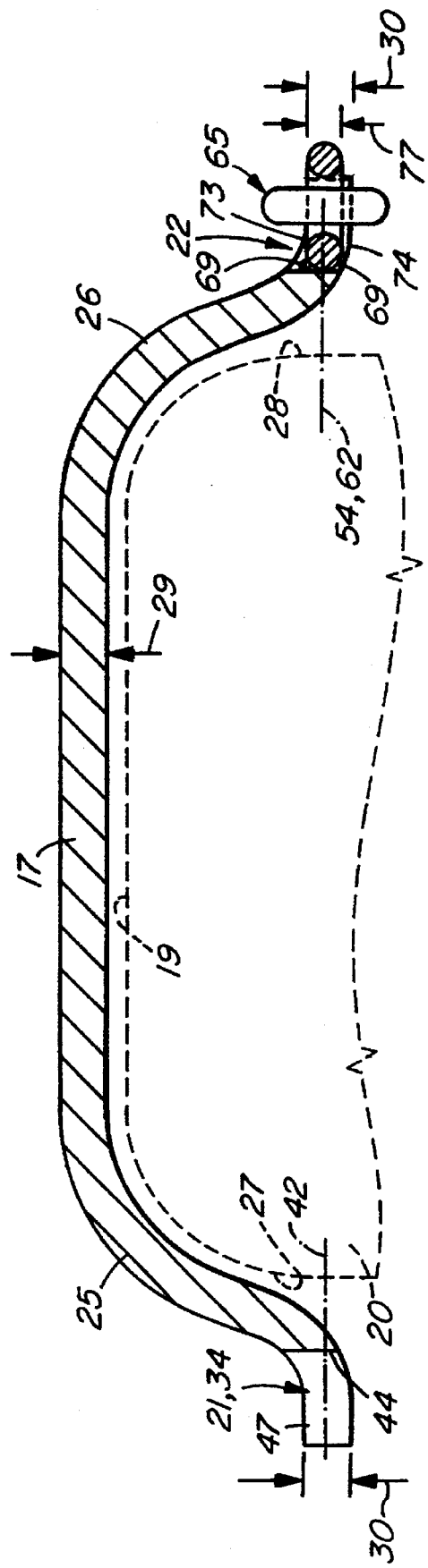
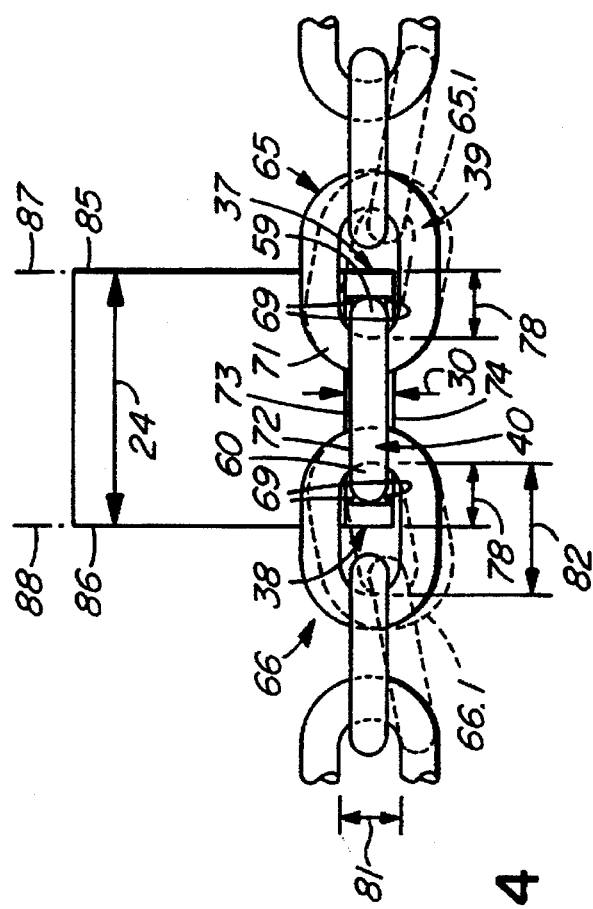
FIG. 3
FIG. 4

TRACTION DEVICE FOR WHEELED VEHICLE

CROSS REFERENCES TO RELATED APPLICATIONS

This is a Continuation-in-Part application of application Ser. No. 08/236,922, filed 2 May 1994, and entitled "Traction Device" and now abandoned.

BACKGROUND OF THE INVENTION

The invention relates to a traction device for improving traction of wheels, and in particular to a light to medium duty traction device for extending as a endless track between a pair of tandem mounted, powered, rubber tired wheels.

It is well known to enclose a single rubber tire with a link chain traction device for improving traction in adverse conditions, such as snow or mud. Such traction devices are characterized by two parallel lengths of conventional link chain which are interconnected by short lengths of link chain to provide a plurality of transversely disposed link chain tread portions for engaging a tread portion of the tire. Opposite ends of the lengths of chain are releasably interconnected to provide two generally similar loops of peripheral chain, interconnected by the transversely disposed tread portion chains.

It is also known to provide two parallel lengths of link chain interconnected by generally rigid cross members, the cross members being shaped, if desired, to conform generally to a cross section or profile of the tire. Such traction devices have sufficient length to pass around at least one pair of tandem mounted tires of a relatively light, rubber tired utility vehicle, so as to provide an endless crawler track. This track functions similarly to the well known heavy duty, interfitting pinned links of crawler tracks commonly associated with full size, heavy duty earth moving tractors etc. In general, rubber tired utility vehicles are more appropriate for medium to light duty earth moving work, snow clearing or other relatively light industrial activity, and in poor traction conditions where normal rubber tires do not provide sufficient traction or floatation, it is usual to fit endless chain traction devices as above described.

Typical link chain traction devices are shown in U.S. Pat. Nos. 1,446,870 (Borst) and 4,232,753 (Carlson), British Patent 411,083 (Vinsot), and Swedish Patent Publication 7802769-9 (Stalberg). The above U.S. and British patents disclose traction devices having a pair of transversely spaced apart lengths of link chains, each length comprising a plurality of interconnected similar links, with rigid cross members extending between regularly spaced particular links of the chain, the particular links being identical to the remaining links. Borst and Vinsot disclose various means to connect ends of the cross members to the particular links, e.g. bolts or cotter pins, such means being time consuming to assemble manually and resulting also in a relatively complex and costly connection. Carlson discloses cross members with end portions having slots or recesses to receive the particular links which are welded to the cross members. Such connections appear to be prone to premature failure due to high stresses associated with the connection, particularly if the connection is rigid and extends a significant distance on either side of the cross member. Stalberg discloses an elongated open-sided hook of flat bar which has separate ends welded to the cross member, the separate ends extending rigidly a considerable distance on either side of the cross member. In applicant's opinion, if the particular mechanical connection of the chain to the cross member is exceptionally long when compared with adjacent links of the chain, as in the Swedish and British patent publications, or when compared to radius of the tire to which the traction device is fitted, high stresses can be developed which can cause failure of the connection between the link and the cross member. In addition, a link that is relatively long when compared with width of the cross member prevents the traction device from being rolled up for storage in a compact manner, thus requiring additional storage space.

In addition, if the cross members are relatively wide compared to the radius of the tire, and connected together with limited rotation therebetween, there is a tendency for stones or rocks to be trapped between one or more cross members and the tire as the cross members are brought into engagement with the tire. A stone trapped between the cross member and the tire can severely damage the tire, often causing puncturing. Alternatively the stone can be temporarily caught by the cross member, and then thrown from the tire as the tire revolves, risking injury to persons nearby.

SUMMARY OF THE INVENTION

The invention reduces difficulties and disadvantages of the prior art by providing a traction device for rubber tires which can be economically manufactured using lengths of conventional wear resisting link chain, with a choice of three types of simple and rugged connections of cross members to individual particular links of the chain. The particular links are identical to remaining links of the chain and alternate with one or more remaining links along the length of the chain to space apart the cross members. Connections between the cross members and adjacent links of the chains are relatively short and flexible, which reduces loads on the connections, thus increasing life of the device. In addition, the flexibility of the link connections and size of the cross members reduces chances of rocks being trapped between the cross members and the tire, thus reducing chances of severe damage to the tire, or chances of the potentially dangerous throwing of rocks from between the tire and the cross member as found with some prior art devices.

A traction device according to the invention is for engaging tandem wheels and comprises two lengths of transversely spaced apart link chains, and a plurality of cross members extending generally transversely between the lengths of chain. Each length of chain has a plurality of similar interconnected links. Each link of the chain has a pair of generally parallel side portions interconnected by a pair of generally arcuate end portions to define a closed periphery of the link. Each cross member has a central portion adapted to contact a tread portion of the tire and a pair of oppositely located end portions adapted to be located generally adjacent respective side walls of the tire. Each end portion has at least one tongue which extends outwardly from the respective end portion to be secured directly to a particular single link of the chain. The tongue has a thickness defined by a space between oppositely located faces of the tongue which is less than a transverse space between opposite side portions of the particular link.

In one embodiment, each end portion of the cross member has a second tongue to provide with the said one tongue a pair of outwardly extending tongues with a recess being located between the tongues, the tongues being located symmetrically about an end portion plane. The side portions and the end portions of the particular link are located symmetrically about a link plane which is generally coincident with the end portion plane of the cross member. One side portion and adjacent portions of the arcuate end portions of the particular link of the chain are secured to an edge of the cross member and portions of the tongue which define in part the recess. Each tongue and an adjacent arcuate end portion of the particular link secured thereto form a reinforced portion which has a combined width which is considerably less than axial space between inner portions of the arcuate end portions of the links of the chain. Thus, when the reinforced portion is encircled by an adjacent link there is sufficient clearance between the adjacent link and the reinforced portion to permit relative hinging between the particular link and the adjacent links.

In another embodiment of the invention, the tongue of each end portion has first and second tongue side edges interconnected by an end edge. Space between oppositely located tongue side edges defines width of the tongues. The side portions and the end portions of the particular link are located symmetrically about a link plane which is inclined generally perpendicularly to the faces of the tongue, the tongue extending between the side portions of the particular length. The tongue is positioned and secured to the said side portions of the particular link to provide clearance between the tongue and the arcuate end portions of the particular link for adjacent links interconnected directly to the particular link, so as to permit relative hinging between the particular link and each adjacent link.

A detailed disclosure following, related to drawings, describes several embodiments of the invention which is capable of expression in structure other than those particularly described and illustrated.

DESCRIPTION OF THE DRAWINGS

FIG. 3 is a simplified section on line 3—3 of FIG. 2, FIG. 4 is an end view of a crossbar as seen from line 4—4 of FIG. 2, showing a portion of the chain in full outline when under tension, and in broken outline when the traction device passes around tires.

DETAILED DESCRIPTION

FIGS. 1 through 4

Figure 1:
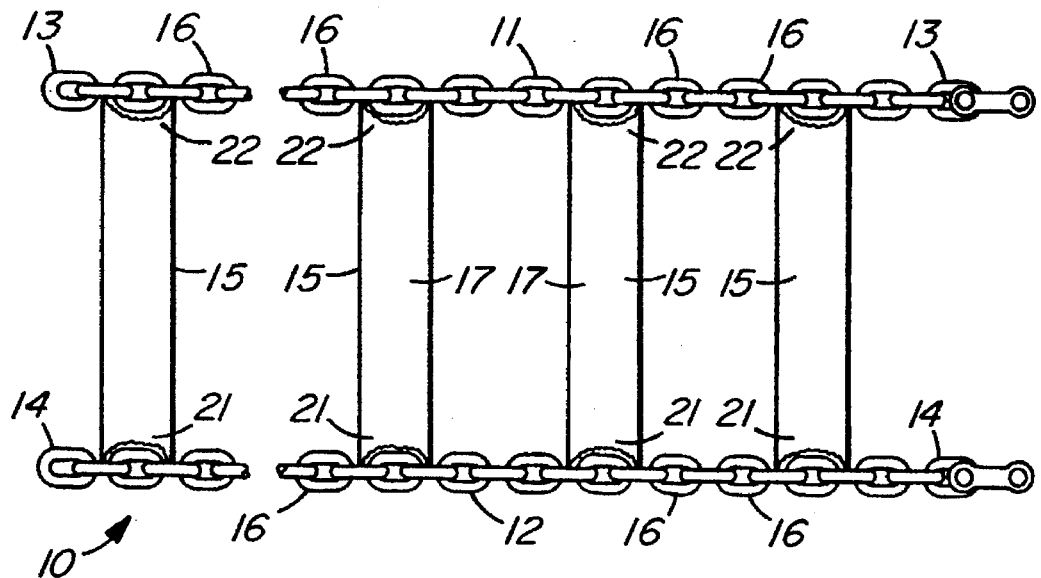
FIG. 1 is a simplified, fragmented plan of a first embodiment of a traction device according to the invention shown on a flat surface and fitted with a pair of chain connectors at adjacent ends of two lengths of link chains which are adapted to connect together outer links at opposite ends of the lengths of chain.

A traction device 10 according to the invention has first and second lengths 11 and 12 of link chains having ends 13 and 14 respectively, which chains are transversely spaced apart and each have a plurality of similar interconnected chain links 16. The chains are preferably high quality, wear resistant chains such as those used in overhead hoists. The device further comprises a plurality of similar cross members 15 extending generally transversely between the lengths of chain as shown. Each cross member has a central longitudinal axis 18, and a central portion 17 adapted to contact a tread portion 19 of a tire 20, the tire being shown in partially in broken outline. Each cross member also has first and second oppositely located end portions 21 and 22 which are interconnected by shallow S-shaped intermediate portions 25 and 26 respectively to the central portion 17. The end portions 21 and 22 and the associated intermediate portions 25 and 26 are adapted to be located generally adjacent respective side walls 27 and 28 respectively of the tire. The cross member is fabricated from a flat bar having a width 24, and thickness 29 of the cross member 15 adjacent the central portion 17 thereof is generally equal to thickness 30 of the cross member adjacent the end portions.

Figure 2:
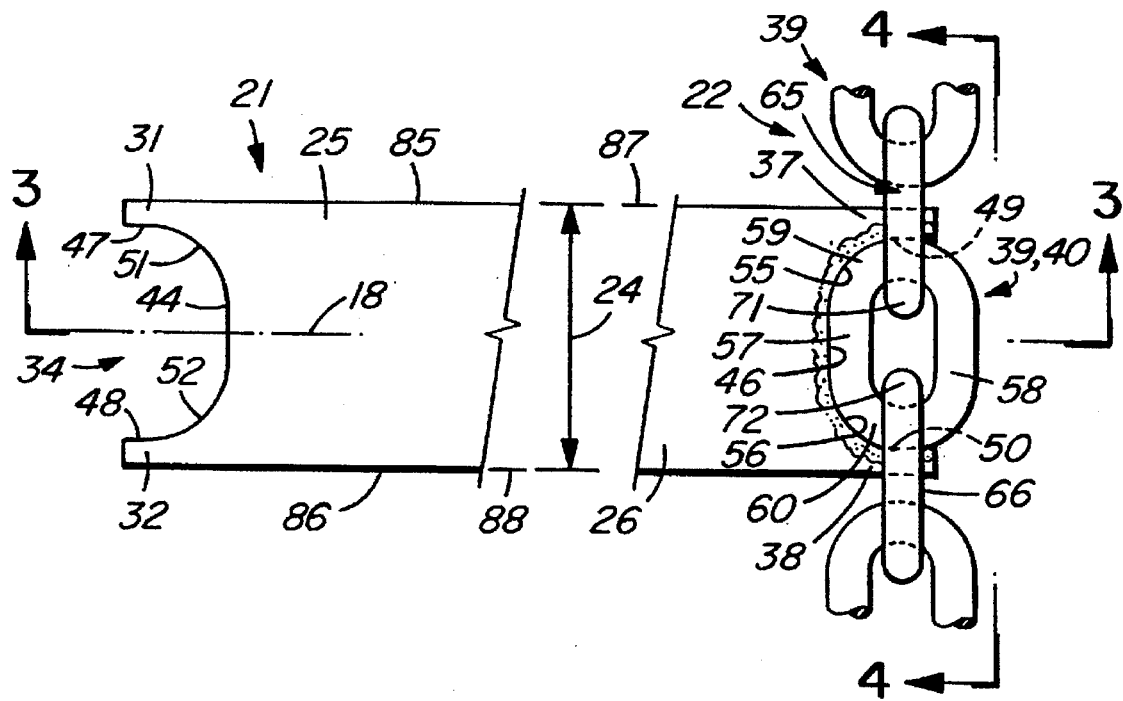
FIG. 2 is a simplified, fragmented top plan of a twin tongue cross member of the first embodiment of the invention, one end of the cross member being shown in an intermediate stage prior to securing the twin tongues to a single link of the chain, and the twin tongues at an opposite end of the cross member being shown connected to a particular link of the chain.

Referring specifically to FIGS. 2 and 3, the first end portion 21 is shown in an intermediate stage of manufacturing for clarity, and has first and second tongues 31 and 32 extending outwardly of the end portion to define a recess 34 therebetween. Similarly, the second end portion 22 has generally similar first and second tongues 37 and 38 extending outwardly therefrom to define a similar recess 39 therebetween. The end portion 22 is shown completed in which a particular single link 40 of the length of chain 12 is secured in the recess 39 as will be described. As seen in FIG. 1, each end portion of the cross member is secured to a particular link, which links are identical to the remaining links 16 of the chains and alternate with one or more remaining links along the lengths of chain to space the cross members equally apart along the chain.

The tongues 31 and 32 are located generally symmetrically about the axis 18 and also about an end portion plane 42 which is generally parallel to the central portion 17 of the cross member 15, although this is not critical. The recess 34 is defined in part by an outwardly facing outer edge 44 of the end portion 21 of the cross member which extends generally transversely across the end portion, and a pair of generally oppositely facing inner edges 47 and 48 of the tongues 31 and 32 respectively. The recess 34 is further defined by first and second arcuate fillet portions 51 and 52 which extend smoothly between the pair of inner edges 47 and 48 of the tongues and the outer edge 44 of the end portion.

The recess 39 of the second end portion is similarly defined by inner edges 49 and 50 of the tongues 37 and 38, an outer edge 46 of the end portion, and first and second arcuate fillet portions 55 and 56 respectively, so that the recesses 34 and 39 are essentially identical. The tongues 37 and 38 are similarly located symmetrically about a second end portion plane 54 (FIG. 3).

The particular link 40 is essentially identical to the remaining links 16 in the chain and has a pair of generally parallel side portions 57 and 58 interconnected by a pair of generally arcuate end portions 59 and 60 to define a closed periphery of the link. The side portions and end portions are located symmetrically about a link plane 62 which is generally coincident with the end portion plane 54 of the second end portion 22 of the cross member. The arcuate fillet portions 55 and 56 have curvatures which are generally equal to each other and generally equal to curvature of adjacent outer edges of the arcuate end portions 59 and 60 of the particular link.

The outer edge 46, the two inner edges 49 and 50 of the tongues 37 and 38 and the edges of the arcuate fillet portions 55 and 56 are welded to adjacent complementary outside surfaces of portions of the particular link 40, namely the side portion 57, and portions of the arcuate end portions 59 and 60. It can be seen that outside portions of the link are generally complementary to the outer edge of the end portion and tongues of the cross member, and to the inner edges of the two tongues. As best seen in FIGS. 3 and 4, the outer end portion 22 of the cross member adjacent the edge of the respective recess has spaced apart faces 73 and 74 which also define the thickness 30 of the cross member. As the recess is preferably formed by shearing a portion from the end portions, the tongues 37 and 38 have similar thicknesses or depths equal to the thickness 30. Each link of the chain is a loop of material of generally circular cross-section, and has a thickness or diameter 77 which is generally similar to, or slightly smaller than, the thickness 30 of the end portion, i.e. the tongues, of the cross member. Thus, if the cross member has a thickness 30 of about ½ inch (13 millimeters), preferably the link has a thickness 77 of about ⅜ inch (10 millimeters). In any event, the thickness of the link should not exceed by a large amount the thickness of the cross member, otherwise the chain is unnecessarily and disproportionately heavy when compared with the cross members.

Thus, when the particular link 40 is fitted between the tongues 37 and 38 it can be positioned generally symmetrically therebetween so that the planes 42 and 62 coincide and surfaces of the link and the edges of the recesses are generally co-planer with each other. This simplifies welding which results in a weld bead 69 passing around approximately one-half of the periphery of the particular link 40, on both sides of the link as seen in FIG. 4. This provides relatively long lengths of weld beads to ensure a sturdy connection. After welding, the tongue 37 and arcuate end portion 39, and the tongue 38 and arcuate end portion 60 form respective reinforced portions at opposite ends of the link. Each reinforced portion has a combined width 78 which is approximately 50 percent wider than thickness of the link by itself, i.e. the tongue is approximately one-half of thickness of the link. Thus, the particular link is securely reinforced by welding to the tongues of the end portion and is able to withstand most stresses generated during normal use. The welding is accomplished fairly simply by providing a simple assembly jig which holds the particular link within the recess, and the weld bead is formed on each side of the link, providing support from weld beads on both sides to ensure a strong connection.

As best seen in FIG. 4, the length of chain 12 further comprises first and second adjacent links 65 and 66 which are directly interconnected to the particular link 40 and, as previously stated, are essentially identical to the link 40 having similar side portions and arcuate end portions. Thus, the first and second adjacent links have arcuate end portions 71 and 72 which pass through and are adjacent the arcuate end portions 59 and 60 respectively of the particular link 40. The combined width 78 of each reinforced portion is considerably less than an axial space 82 between the arcuate end portions of any link. Thus, when each reinforced portion is encircled by one of the adjacent links 65 and 66, there is sufficient clearance between the adjacent link and the reinforced portion to permit relative hinging between the particular link and each adjacent link. The adjacent links 65 and 66 are shown in broken outline in partially hinged positions 65.1 and 66.1 respectively, which positions are attained when the length of link 12 is under less tension, or passes around the tire. It can be seen that the thickness 30 of the end portion 21, which is also the thickness of the tongues 37 and 38, is less than a transverse space 81 between side portions of any link, so as to permit insertion of the tongue into the link, and relative hinging therebetween as described. While it is possible to use a cross member having a thickness slightly greater than the transverse space 81 between the side members of the links, this would require additional machining to attain adequate swinging between the links, which would of course increase costs of manufacturing, and thus should be avoided.

As best seen in FIGS. 2 and 4, the cross member has first and second side edges 85 and 86 which are located in generally parallel edge planes 87 and 88 respectively and extend between the opposite end portions of the cross member. The cross member is formed with simple curvatures and does not require warping as is required in some prior cross members. In addition, the planes 87 and 88 extend to outer adjacent edges of the tongues, so that outer edges of the tongues are spaced apart at the width of the cross member. Clearly the links are slightly shorter than the width 24 and the cross member does not increase length of the "hinge" and thus does not increase stresses on the chain.

Figure 5:
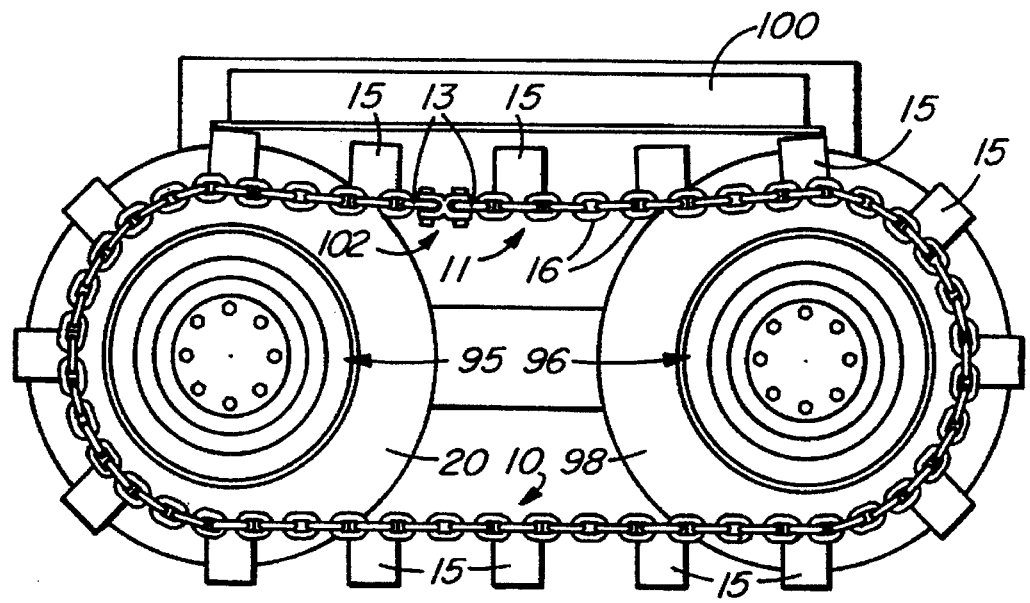
FIG. 5 is a simplified, fragmented side elevation of a chassis of a vehicle showing a track installed on a pair of tandem mounted rubber tired wheels.
Figure 6:
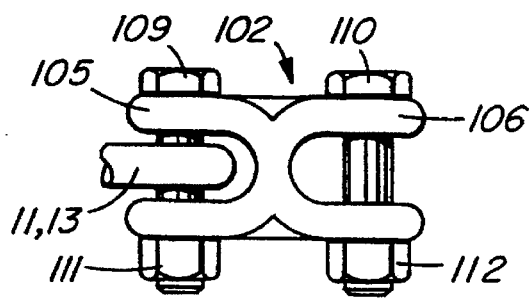
FIG. 6 is a simplified, fragmented side view of a prior art twin clevis link connector that can be used to connect together ends of a chain.
Figure 7:
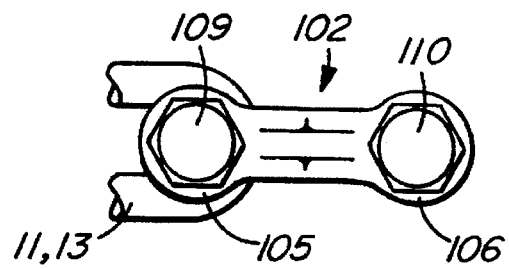
FIG. 7 is a fragmented top plan of the link connector of FIG. 6.

FIGS. 5 through 7

The traction device 10 is shown fitted on a pair of tandem mounted rubber tired wheel 95 and 96, the wheel 95 having the tire 20, and the wheel 96 having a similar tire 98. The wheels are journalled for rotation about respective axes on a chassis 100 of a utility vehicle, not shown, the length of chain 11 only being shown in FIG. 5. A prior art twin clevis connector 102 is shown connecting the ends 13 of the length of chain 11 together to form an endless loop. As seen in FIGS. 6 and 7, the twin clevis connector 102 has integral, oppositely facing first and second U-shaped clevis portions 105 and 106, which have aligned openings to receive clevis bolts 109 and 110 respectively which are secured by nuts 111 and 112 respectively. When fitted, the bolts 109 and 110 are generally parallel to each other and engage arcuate end portions of the links at the outer ends 13 of the length of chain 11.

OPERATION

Because the chain is relatively light, installing the chain is relatively simple and many of the complexities of installation of prior art traction devices can be eliminated. For example, in the present invention it is not necessary to deflate the tires 20 and 98 prior to installing the chain. The device 10 can be installed on rubber tired vehicles following simplified common procedures which are briefly described. The traction device is placed flat and elongated on a level surface and the vehicle is driven slowly onto the traction device until the wheels are located between ends 13 and 14 of the lengths of chain. The ends of the traction device are then pulled upwardly and over the wheels, and links are added or removed as needed to attain the appropriate lengths of chain. When the chains are the correct length, the chains can be drawn tightly over the tires using a conventional tensioning device, such as a conventional ratchet actuated winch or equivalent device, until the ends 13 and 14 of the chains can be brought sufficiently close together to enable the bolts 105 and 106 to pass through the clevises to connect the end of the links together. During such tensioning it has been found that hammering the tread portion of the tire as the tensioning device is actuated permits the end of the chain to be brought closer together without imposing an undue strain on the traction device, or on the tires themselves. The ends of the device are thus secured together when sufficiently close together using the connector 102 or, if desired, an alternative to be described, so as to form a continuous loop.

It has been found that tension in the traction device can be selected by adjusting the number of links in the chain to provide a convenient "slipping clutch" which can assist in protecting the traction device and/or power train of the vehicle should the vehicle be used in excessively heavy duty applications to the point of stalling, i.e. beyond the normal capacity of the vehicle. If the tension in the belt is correctly selected, i.e. sufficiently high to transmit power under normal conditions, but sufficiently low to slip under excessive conditions, when operating the vehicle in excessive conditions, just before the vehicle stalls, the wheels will slip within the belt, thus protecting to some degree the vehicle power train and the traction link.

As shown, the cross members are separated by five free links, which engage single links welded to the cross members and this has been found convenient for average-sized wheels used in light to medium duty vehicles. It has also been found that typical-sized rocks encountered in normal applications usually pass between the cross members to avoid being trapped between the cross members and the tire, thus essentially eliminating chances of damaging the tire. Because the particular links secured to the end portions of the cross members are relatively freely hinged to adjacent links, the cross members have reasonably loose connections to the chain, even when passing around a tire. Thus, if a rock falls on the lower run of a traction device and approaches one of the wheels, the cross members adjacent the rock can rotate or swivel with respect to the chain and in many cases eject the rock without damage to the tire. This contrasts with some prior art traction devices which have cross members which are hinged for very limited rotation with respect to adjacent cross members or connecting links, and tend to trap rocks between the traction device and the tire, thus causing tire damage. Clearly, normal precautions should be taken to avoid any rocks ejected by the traction devices.

ALTERNATIVES

In some applications, spacing between the cross members can be selected to provide more closely spaced cross members, that is to provide higher floatation, or more widely spaced cross members, that is to provide lower floatation. Clearly, relative orientation of the particular links for connection to cross members must be appropriate for the particular type of connection.

While the traction device is shown for use with two powered rubber tired wheels disposed in tandem, the device could be used with three or more wheels in tandem. Alternatively, in some instances, the device can be used with at least one sprocket to drive the traction device, such sprocket, not shown, having teeth which pass between the cross members to transfer power thereto. Clearly, spacing between the cross members can be selected to accommodate thickness of the sprocket teeth if used in this application.

Figure 8:
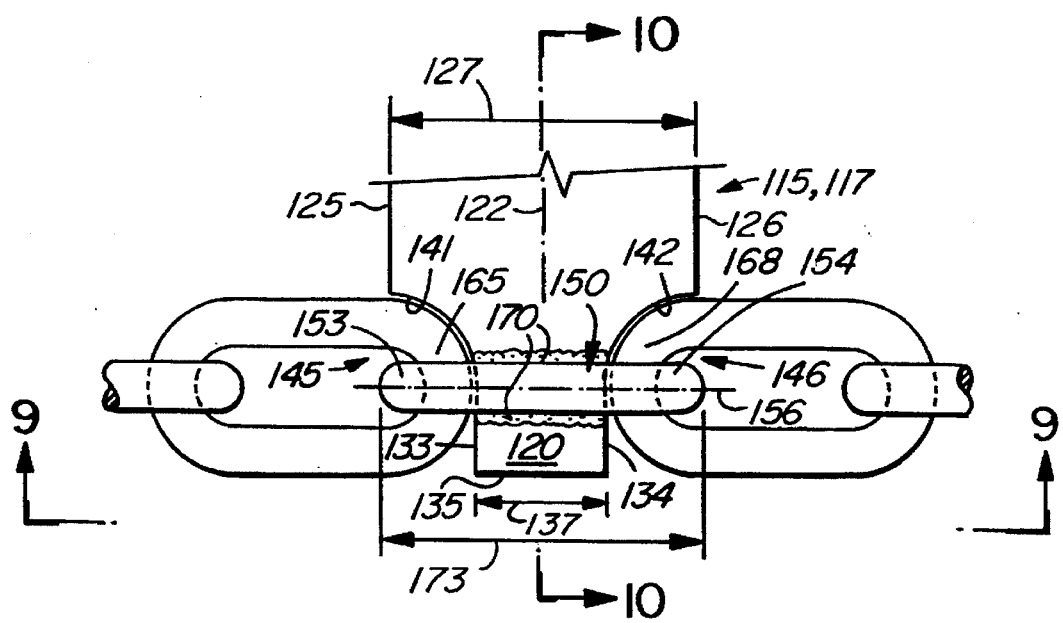
FIG. 8 is a simplified, fragmented top plan of one end portion of a second embodiment of the invention, showing a single tongue cross member with a single link connected thereto and adjacent links of the chain.
Figure 9:
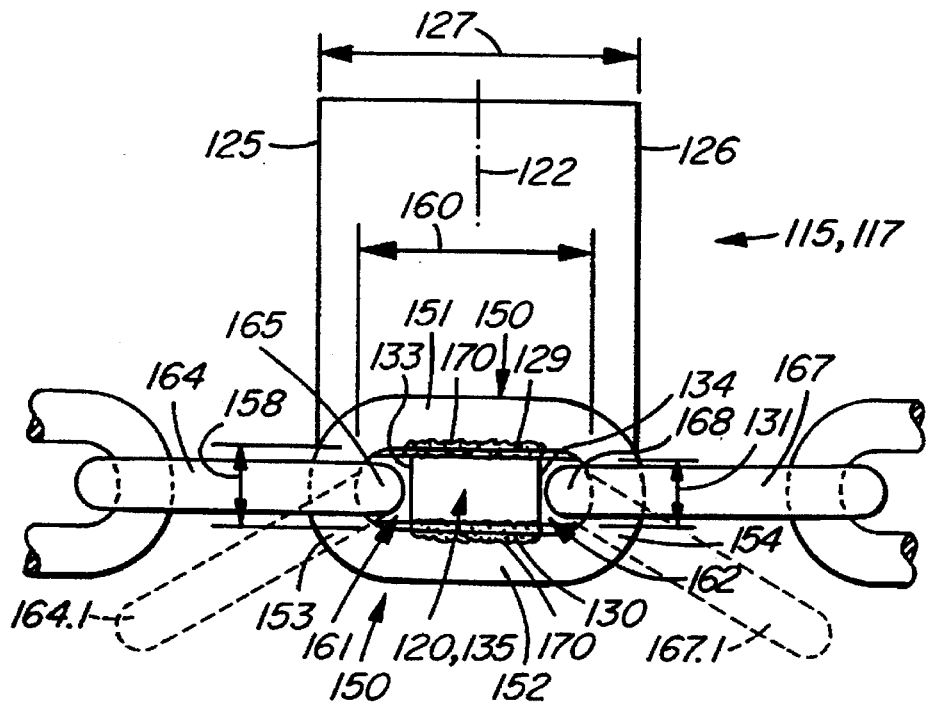
FIG. 9 is a simplified, fragmented end view of the cross member as seen from Line 9—9 of FIG. 8, showing a portion of the chain in full outline when under tension, and in broken outline when the traction device passes around a tire, or is rolled up for storage.
Figure 10:
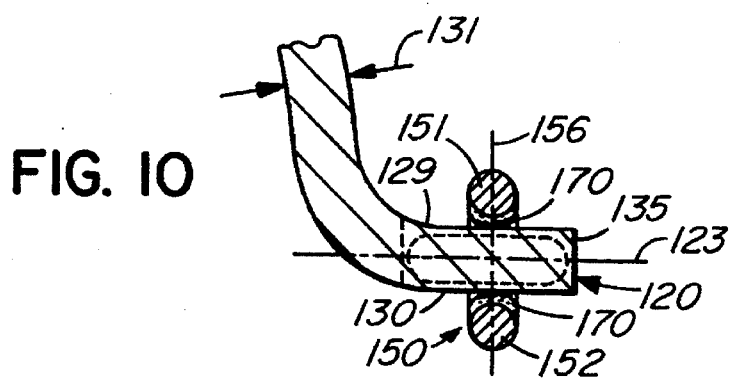
FIG. 10 is a simplified, fragmented longitudinal section on Line 10—10 of FIG. 8, some hidden detail being shown in broken outline.

FIGS. 8 through 10

An alternative or second embodiment cross member 115 according to the invention has a central portion and opposite S-shaped intermediate portions which function similarly to corresponding portions in FIGS. 1 through 4, and thus are not shown fully. The member 115 has first and second end portions which are generally similar to each other, and thus one end portion 117 only is shown and described. The end portion 117 has a single tongue 120 extending therefrom and disposed symmetrically about a central longitudinal axis 122 of the cross member and also disposed symmetrically about an end portion plane 123. Similarly to the previous member 15, the alternative cross member is formed from flat bar and has first and second side edges 125 and 126 spaced apart to define width 127 of the cross member. The cross member has first and second faces 129 and 130 spaced apart and defining thickness 131 of the cross member and also of the tongue 120. Similarly to the first cross member 15 of FIGS. 1–4, the first and second side edges 125 and 126 of the alternative cross member 115 extend within generally parallel planes, not shown, which extend between the end portions of the cross member, except where the end portions are recessed to provide the tongue 120 as will be described. The alternative cross member has a profile generally complementary to the tread portion of the tire, when viewed along the tire, and can have a shape generally similar to the shape of the first embodiment as seen in FIG. 3.

The tongue 120 has first and second tongue side edges 133 and 134 interconnected by an end edge 135. Space between the tongue side edges 133 and 134 adjacent the end edge 135 define width 137 of the tongue, and, as before described, the space between oppositely located faces 129 and 130 of the tongue defines the thickness 131 of the tongue. The first end portion 117 of the alternative cross member further comprises first and second arcuate fillet portions 141 and 142 extending smoothly between the first and second side edges 125 and 126 of the cross member and the adjacent first and second side edges 133 and 134 respectively of the tongue to define in part first and second recesses 145 and 146 respectively disposed symmetrically on opposite sides of the tongue.

A length 147 of link chain has a particular link 150 which is essentially identical to the remaining links of the chain, but can be a different overall shape from the particular link 40 of the first embodiment as will be described. The link 150 has similar generally parallel side portions 151 and 152 interconnected by a pair of generally arcuate end portions 153 and 154 to define a closed periphery of the link. Similarly to the first particular link, the side portions and end portions of the link 150 are disposed symmetrically about a link plane 156 which, in this instance, is inclined generally perpendicularly to the plane 123, i.e. to the faces of the tongue 120 as best seen in FIG. 10.

Referring to FIG. 9, a transverse space 158 between side portions 151 and 152 of the particular link 150 is greater than the thickness 131 of the tongue to accept the tongue extending between the side portions of the particular link. A longitudinal space 160 between the end portions 153 and 154 of the link is greater than the width 137 of the tongue by at least twice the thickness of the links for reasons as follows. The tongue is positioned and secured symmetrically to the side portions 151 and 152 of the link to provide first and second clearances 161 and 162 respectively between the side edges 133 and 134 of the tongue and the arcuate end portions 153 and 154 of the particular link. The clearance 161 accepts an adjacent link 164 which has an arcuate end portion 165 passing between the arcuate end portion 153 and the side edge 133 of the tongue with sufficient clearance to permit relative hinging between the links. Similarly, the clearance 162 accepts an arcuate end portion 168 of an adjacent link 167 for hinging thereabouts. Thus, the side edges 133 and 134 of the tongue are spaced from adjacent arcuate end portions 153 and 154 of the link by the clearances 161 and 162 which are greater than thickness of the arcuate end portions of the adjacent links interconnected directly to the particular link to permit said hinging. The links 164 and 167 can swing to at least inclined positions 164.1 and 167.1 as shown in broken outline, which positions are inclined at angles to the particular link 150 which can be greater than angles shown in FIG. 4. This is because the arcuate end portions of the adjacent links are essentially free to swing with respect to the particular links through relatively normal ranges of angles without interference with any portions of the cross member.

As best seen in FIG. 10, the side portions of the particular link are secured by welding to adjacent faces of the tongue, lengths of weld bead 170 being shown. The weld bead 170 is relatively easy to form, particularly that portion of the bead on the outside of the link adjacent the end face of the tongue. The weld bead on the opposite side of the link, i.e. closer to the intermediate portion of the cross member, is somewhat more difficult due to confinement by the shallow S-shaped intermediate portion of the cross member. Nevertheless, the link can be held easily in a simple jig and relatively easily welded, and can provide a long length of weld bead which ensures a rugged connection between the link and the cross member. It can be seen that the weld beads 170 extend between faces of the tongue and along the side portions of the link 150 to provide a plurality of independent, essentially continuous connections across the width of the tongue.

As best seen in FIG. 8, the first and second fillet portions 141 and 142 have respective arcuate edges which define in part the respective recesses 145 and 146. The edges of the portions 141 and 142 have similar curvatures which are slightly larger and complementary to corresponding curvatures of the arcuate end portions 165 and 168 of the adjacent links 164 and 167 respectively. Clearly, the recesses 145 and 146 provide clearances for the swinging of the adjacent links with respect to the single particular link.

In addition, it can be seen that the particular link 150 has a link length 173 as measured longitudinally and externally between outer faces of the arcuate end portions 153 and 154, which length is approximately equal to the cross member width 127. In this way, it can be seen that the recesses permit use of a shorter link so that outer edges of the particular link do not protrude appreciably beyond the edges 125 and 126 of the cross member, thus providing a relatively compact traction device in which the links and cross members have compatible sizes. In contrast to the relatively short oval links of the first embodiment, in the second embodiment the links are relatively elongated so as to be more compatible with width of the cross member. For example, in the first embodiment, the links are a typical wear resisting links having an internal length to breadth ratio of about 2.2:1, ie. ratio of the longitudinal space 82:the transverse space 81. In contrast, in the second embodiment the links are somewhat elongated and have an internal length to breadth ratio of about 3.2:1, i.e. ratio of the longitudinal space 160:the transverse space 158. It is considered that the second embodiment is more suitable for relatively heavier duty applications in which the cross members have widths of between approximately 3 and 6 inches (between approximately 8 and 15 cm), which contrasts with the width 24 of the first cross member which is typically between about 2 and 2½ inches (between approximately 5 and 6 cm).

In both of the above embodiments disclosed, it can be seen that each end portion of the cross member has at least one recess therein to define in part at least one tongue which extends outwardly from the respective end portion to be secured to a particular single link of the chain.

Figures 11, 12:
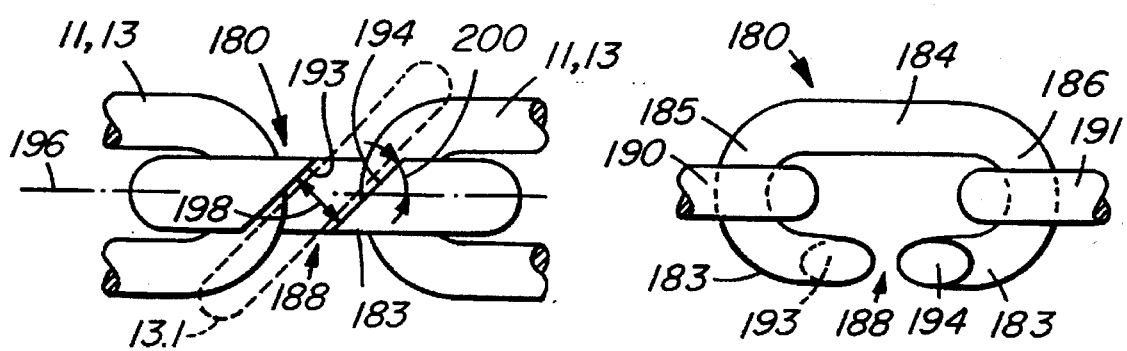
FIG. 11 is a side view of a preferred split link connector according to the invention, portions of adjacent links being shown in full outline when ends of the chain are fitted together, and a temporary position of one link being shown in broken outline when connecting or disconnecting ends of the links.
FIG. 12 is a top plan of a link connector of FIG. 11.

FIGS. 11 and 12

A preferred connector link 180 is for connecting together opposite ends of each length of chain and can be substituted for the prior art twin clevis connector 102 of FIGS. 5 through 7. The connector link 180 has first and second generally parallel side portions 183 and 184 interconnected by a pair of generally arcuate end portions 185 and 186 to define a periphery of the connector link which is generally similar to that of the previously described links. However, in contrast to the previously described links, the periphery of the connector link 180 is not closed, and the first side portion has an obliquely inclined slot 188 therein for insertion and removal of one of the links at the end 13 of the chain and interconnected to the connector link 180 as shown. The first side portion thus has end faces 193 and 194 which are disposed parallel to each other and inclined obliquely to a connector link plane 196. Thus, the slot is defined by the obliquely disposed, oppositely facing generally plane end faces 193 and 194 defining opposed ends of the side portion 183. The faces 193 and 194 are spaced apart at a perpendicular distance 198 which is only slightly larger than the diameter or thickness of the end portions or side portions of the adjacent links.

Thus, the perpendicular distance 198 is sufficient to admit a portion of one other link to pass therethrough when a portion of the other link is aligned with the slot, i.e. is disposed generally parallel to at least one plane end face of the side portion 183. Assuming the end faces of the side portions are disposed within generally parallel planes, the planes are inclined at generally equal angles 200 to the connector link plane 196, the angle 200 being about 45 degrees, but it could be between about 30 degrees and 60 degrees. Because one side portion of the connector link 180 has been weakened by the slot, strength of the link 180 is reduced considerably. To ensure that the connector link has a strength generally equivalent to strength of the remaining links in the chain, the strength of the connector link is increased, which is most easily accomplished by selecting a longer link, i.e. the next link size upwards in standard chain links. Thus, if the normal links of the chain are ⅜ inch, the connecting link should be fabricated from a ½ inch link. To maintain strength, preferably the connector link should be a higher grade of steel to also compensate for the slot in the side portion.

In operation, it can be seen that while the length of chain connected by the connector link 180 is under tension, the links at the ends 13 cannot be separated from the connector link 180. However, when the tension of the chain is slackened sufficiently, one of the links at the end 13 can be disposed at an inclined angle as shown in broken outline at 13.1, which will permit separation of the ends of the chains, or reconnection as required. Clearly, because no nuts and bolts are required, this alternative is much faster to use than the conventional twin clevis connector as shown in FIGS. 6 and 7, but care must be taken when using it to ensure that the lengths of chain cannot become accidentally slackened during use which might result in unintentional disconnection of the chain.

Figure 13:
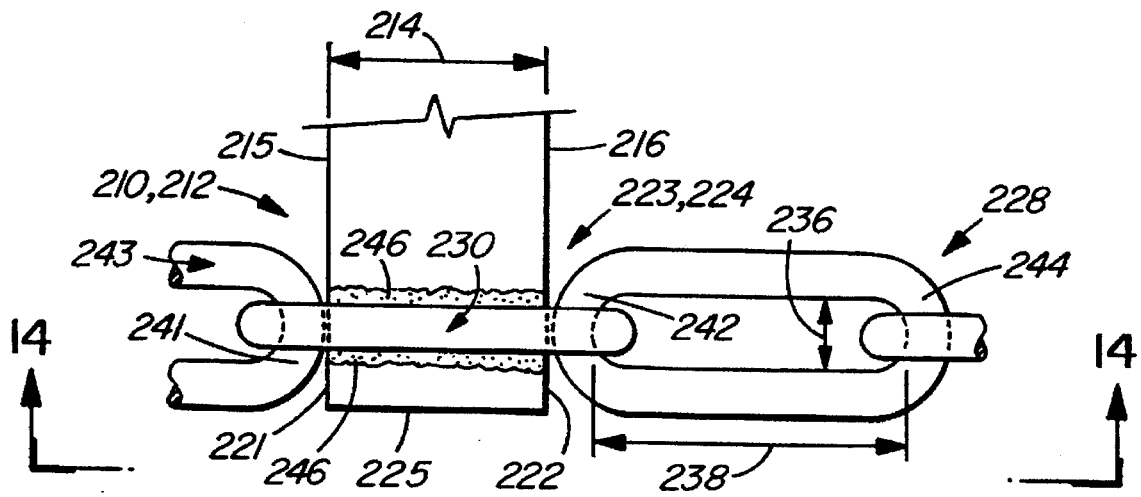
FIG. 13 is a simplified, fragmented top plan of one end portion of a third embodiment of the invention, showing a cross member and a tongue of equal width and a single link connected thereto, and some adjacent links of the chain.
Figure 14:
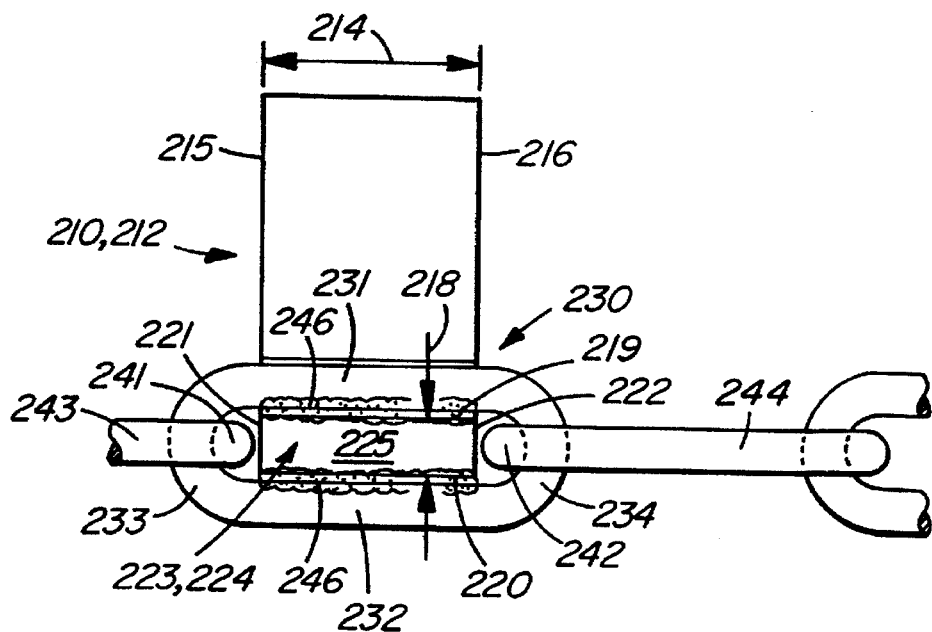
FIG. 14 is a simplified, fragmented end view of the cross member as seen from line 14—14 of FIG. 13, showing a portion of the chain in full outline when under tension.

FIGS. 13 and 14

A third embodiment of the invention 210 resembles the second embodiment in the manner of attachment of the cross member to the particular single link. In some respects, the third embodiment is simpler to manufacture than the second embodiment because the cross member and tongue have the same widths and thus it is not necessary to provide recesses on the cross member. Consequently, the cross member in formed from flat bar with ends cut perpendicularly to side edges thereof, and bent to conform to the profile of the tire as before. However, to provide a cross member of reasonable width and thickness, a conventional wear resisting chain is not appropriate as the length to breadth ratio of conventional chain links is not appropriate for the width and thickness respectively of the cross member. Thus, a relatively unusual elongated link chain is required, and while such chains are available, they are considerably more costly than the conventional chains shown in the first and second embodiments.

The third embodiment 210 has an alternative cross member 212 which has a central portion with a width 214 defined by a space between a first and second cross member side edges 215 and 216. Similarly, the cross member has a thickness 218 defined by a space between opposed surfaces 219 and 220. As seen in FIG. 13, a first end portion 223 of the cross member provides a tongue 224 with an end face 225 which is disposed generally perpendicularly to the side edges and thus is a simple rectangular ended flat bar. The tongue has first and second tongue side edges 221 and 222 which are equivalent to the first and second tongue side edges of the second embodiment as previously described. However, in contrast to the second embodiment, the edges 221 and 222 are co-planar with the first and second side edges 215 and 216 of the central portion, so that the widths of the central portion and tongues are equal to each other.

The invention uses an elongated link chain 228 having a plurality of similar links in which a particular link 230 has a pair of generally parallel side portions 231 and 232 interconnected by a pair of generally arcuate end portions 233 and 234 to define a closed periphery of the link. The link 220 resembles previously described links, but has an internal length to breadth ratio which is generally greater than about 4.0:1 which is greater than the internal length to breadth ratios of the typical links previously described. For clarity, typical dimensions of the link 230 are shown on a similar adjacent link. Similarly to the second embodiment, a transverse space 236 between the side portions 231 and 232 is slightly greater than the thickness 218 of the cross member and tongue to receive the tongue therebetween. Similarly to the second embodiment, longitudinal space 238 between the arcuate end portions 233 and 234 is greater than the width of the tongue by an amount greater than twice thickness of the link. Thus, there is a clearance on each side of the tongue which is sufficient to receive an arcuate end portion 241 or 242 of adjacent link 243 or 244. Thus, similarly to the second embodiment, the adjacent links can swing essentially unrestrictedly through relatively large arcs for folding the traction device for storage and passing around tire, etc.

To secure the particular single link to the cross member, weld beads 246 are formed between the inwardly facing portions of the side members and the surfaces of the end portion or tongue, in a manner generally similar to that for the second embodiment. Clearly, a longitudinal section of the third embodiment would closely resemble the longitudinal section of the second embodiment as shown in FIG. 10.

It has been found that the cross member in this embodiment tends to be heavier than the two previously described embodiments and thus is appropriate for medium to heavier duty applications. Clearly, to limit extension of the arcuate end portions of the particular link from the side edges of the cross member, care should be taken in selecting width of the cross member and length of the link so that "overhang" or extensions of the arcuate end portions of the links are minimized, thus reducing twisting forces and restraint on the end portion.

FIG. 15

It can be seen that for all three embodiments of the invention, the tongue has a thickness less than the transverse space 81 between opposite side portions of the link, and preferably the difference between the tongue thickness and side portion spacing should be relatively small to provide a cross member of adequate strength in the first embodiment, and to reduce the amount of weld filler necessary for welding in the second and third embodiments.

The cross members can be provided with traction and/or wear enhancing means, and one examples of such means is described. End portions of the cross member are shown simplified but can be connected to chains in accordance with either the twin tongue structure of FIGS. 1 through 4, the recessed single tongue structure of FIGS. 8 through 10, or the simplified non-recessed tongue structure of FIGS. 13 and 14.

Figure 15:
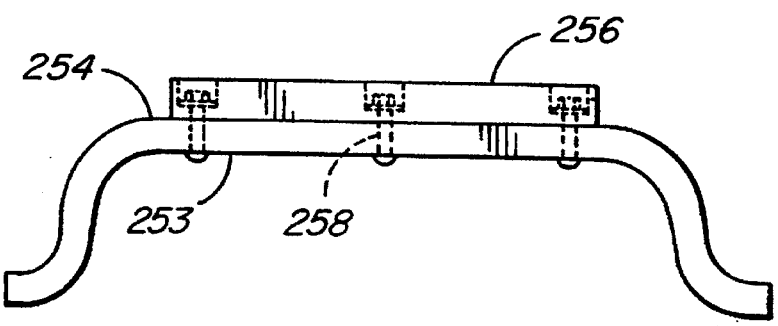
FIG. 15 is a simplified end view of a cross member fitted with a rubber wear pad.

Referring to FIG. 15, a cross member 253 has a base surface 254 carrying a rubber wear pad 256 which is secured thereto using fasteners 258 which are recessed into an outer surface of the rubber pad. For economy, if desired, the pad 256 can be cut from used truck tires which are heavily reinforced and wear well. Cross members fitted with rubber pads are more appropriate for use on hard surfaces or in wet mud, etc., where increased friction is required.

I claim:

1. A traction device for engaging wheels, the traction device comprising:
   (a) two lengths of transversely spaced apart link chains, each length of chain having a plurality of similar interconnected links, each link of the chain having a pair of generally parallel side portions interconnected by a pair of generally arcuate end portions to define a closed periphery of the link, and
   (b) a plurality of cross members extending generally transversely between the lengths of chain, each cross member having a central portion adapted to contact a mid-portion of the wheel, and a pair of oppositely located end portions adapted to be located generally adjacent respective side walls of the wheel, each end portion having a pair of tongues which extends outwardly from the respective end portion and is secured directly to a particular single link of the chain, a recess being located between the tongues of each end portion so that the tongues are located generally symmetrically about an end portion plane; the side portions and the end portions of the particular link being located symmetrically about a link plane which is generally coincident with the end portion plane of the cross member, one side portion and adjacent portions of the arcuate end portions of the particular link of the chain being secured to portions of the tongues which define in part the recess, each tongue and an adjacent arcuate end portion of the particular link secured thereto forming a reinforced portion which has a combined width which is considerably less than longitudinal space between inner portions of the arcuate end portions of the particular link so that when the reinforced portion is encircled by an adjacent link, there is sufficient clearance between the adjacent link and the reinforced portion to permit relative hinging between the particular link and each adjacent link.

2. A device as claimed in claim 1, in which:

(a) the tongue has a thickness defined by space between oppositely located faces of the tongue which is less than a transverse space between opposite side portions of the particular link, and (b) the side portions of the particular single link have a thickness similar to the thickness of the tongue.

3. A device as claimed in claim 1, in which:

(a) the tongue is located symmetrically about an end portion plane which is disposed generally parallel to the central portion of the cross member, and (b) thicknesses of the cross member adjacent the end portions thereof and adjacent the central portion thereof are generally equal.

4. A device as claimed in claim 1, in which:

(a) the recess is defined in part by an outwardly facing outer edge of the end portion of the cross member which extends generally transversely across the end portion, and a pair of generally oppositely facing inner edges of the two tongues, and (b) an outside portion of the link is complementary to the outer edge of the end portion and the inner edges of the two tongues.

5. A device as claimed in claim 4, in which:

(a) the recess is further defined by a pair of arcuate fillet portions which extend between the pair of inner edges of the tongues and the outer edge of the end portion.

6. A device as claimed in claim 5, in which:

(a) the arcuate fillet portions have curvatures which are generally equal to each other and are generally equal to curvature of adjacent outer edges of the arcuate end portions of the particular single link.

7. A device as claimed in claim 4, in which:

(a) the outer edge of the end portion of the cross member and the two inner edges of the tongues are welded to adjacent complementary portions of the particular link.

8. A device as claimed in claim 1, in which:

(a) the cross member has first and second side edges which are located within generally parallel edge planes and extend between the opposite end portions of the cross member, and also provide outer edges of the tongues so that the outer edges of the tongues are spaced apart at width of the cross member.

9. A device as claimed in claim 1, further including a chain connector link for connecting together opposite ends of each length of chain, each chain connecter link comprising:

(a) a pair of generally parallel side portions interconnected by a pair of generally arcuate end portions to define a periphery of the connector link, one side portion of the connector link having an obliquely inclined slot therein, the slot being defined by obliquely disposed, oppositely facing generally plane end faces defining opposed ends of the said one side portion, a perpendicular distance between the plane end faces being sufficient to admit a portion of one other link to pass therethrough when the portion of the said one other link is disposed so as to be generally parallel to at least one plane end face of the side portions.

10. A device as claimed in claim 9, in which:

(a) the plane end faces of the side portions are parallel to each other.

11. A device as claimed in claim 9, in which:

(a) the side portions and the end portions of the chain connector link are disposed within a connecter link plane, and (b) the end faces of the side portions are disposed within generally parallel planes which are inclined at generally equal angles to the link plane of between about 30 degrees and 60 degrees.

12. A traction device for engaging wheels, the traction device comprising:

(a) two lengths of transversely spaced apart link chains, each length of chain having a plurality of generally similar interconnected links, each link of the chain having a pair of generally parallel side portions interconnected by a pair of generally arcuate end portions to define a closed periphery of the link, and (b) a plurality of cross members extending generally transversely between the lengths of chain; each cross member having a central portion adapted to contact a mid-portion of the wheel, and a pair of oppositely located end portions adapted to be located generally adjacent respective side walls of the wheel; each cross member also having first and second side edges which extend between the end portions of the cross member; each end portion having a tongue which extends outwardly from the respective end portion to be secured directly to a particular link of the chain, each tongue having a thickness defined by a space between oppositely located faces of the tongue which is less than a transverse space between opposite side portions of the particular link to permit the tongue to pass between the side portions of said link; each end portion of the cross member having a recess on opposite sides thereof defining a respective tongue side edge so that each tongue has first and second tongue side edges interconnected by an end edge, space between the oppositely located tongue side edges defining width of the tongue; each end portion also having first and second fillet portions extending between the first and second side edges respectively of the cross member and the adjacent first and second side edges respectively of the tongue so as to define in part the respective recesses; the side portions and the end portions of the particular link being located generally symmetrically about a link plane which is inclined generally perpendicularly to the faces of the tongue, the tongue being positioned to extend between and to be secured directly to the said side portions of the particular link so that each recess provides clearance between the tongue and the adjacent arcuate end portions of the particular link to receive portions of adjacent links interconnected directly to the particular single link so as to permit relative hinging between the particular single link and each adjacent link.

13. A device as claimed in claim 12, in which:

(a) the side edges of the tongue are spaced from the adjacent arcuate end portions of the said particular link by clearances greater than thickness of an arcuate end portion of an adjacent link interconnected directly to the particular link to permit hinging of the adjacent links with respect to the particular link.

14. A device as claimed in claim 12, in which:

(a) each tongue is located symmetrically with respect to the central portion of the cross member.

15. A device as claimed in claim 12, in which:

(a) the first and second fillet portions have respective arcuate edges which define in part the respective recesses and have similar curvatures which are slightly larger than and complementary to corresponding curvatures of the arcuate end portions of the adjacent links of the chain, so as to provide clearance for swinging of the adjacent links with respect to the single particular link.

16. A device as claimed in claim 12, in which:

(a) the cross member has a cross member width defined by space between the first and second side edges thereof, and (b) the particular link has a link length as measured longitudinally between outer faces of the arcuate end portions of the particular link, the link length being approximately equal to the cross member width.

17. A traction device for engaging wheels, the device comprising:

(a) two lengths of transversely spaced apart link chains, each length of chain having a plurality of generally similar interconnected closed links, each link of the chain having a pair of generally parallel side portions inter-connected by a pair of generally arcuate end portions to define a closed periphery of the link, (b) a plurality of cross members extending generally transversely between the lengths of chain, each cross member having a central portion adapted to contact a mid-portion of the wheel, and a pair of oppositely located end portions adapted to be located generally adjacent respective side walls of the wheel; each end portion having a tongue which extends outwardly from the respective end portion and is secured directly to a particular single closed link of the chain, each tongue having first and second tongue side edges interconnected by an end edge, space between oppositely located tongue side edges defining width of the tongue, each tongue having a thickness defined by space between oppositely located faces of the tongue which is less than a transverse space between opposite side portions of the particular link to permit the tongue to pass between the side portions of the said particular link, and (c) a plurality of weld beads extending between the tongue and along the side portions of the particular link to provide a plurality of independent, essentially continuous connections across the width of the tongue.

18. A device as claimed in claim 17, in which:

(a) the tongue of each end portion has first and second tongue side edges interconnected by an end edge, space between oppositely located tongue side edges defining width of the tongue, and (b) the side portions and the end portions of the particular link being located symmetrically about a link plane which is inclined generally perpendicularly to the faces of the tongue, the tongue extending between the side portions of the particular link, the tongue being positioned and secured directly to the said side portions of the particular link to provide clearance between the tongue and the arcuate end portions of the particular link for adjacent links interconnected directly to the particular link, so as to permit relative hinging between the particular link and each adjacent link.

19. A device as claimed in claim 17, in which:

(a) the central portion of the cross member has a cross member width defined by a space between the first and second side edges thereof which is equal to the width of the tongue.

20. A device as claimed in claim 17, in which:

(a) each end portion of the cross member has a recess on an opposite side thereof defining an adjacent tongue side edge, each recess providing clearance to receive portions of the adjacent links interconnected directly to the particular single link.

21. A device as claimed in claim 20, in which:

(a) each cross member has first and second side edges which extend within generally parallel planes between the end portions of the cross member, and (b) first and second fillet portions extend between the first and second side edges respectively of the cross member and the adjacent first and second side edges respectively of the tongue to define in part the adjacent recesses.

22. A device as claimed in claim 21, in which:

(a) the first and second fillet portions have respective arcuate edges which define in part the respective recesses and have similar curvatures which are slightly larger than and complementary to corresponding curvatures of the arcuate end portions of the adjacent links of the chain, so as to provide clearance for swinging of the adjacent links with respect to the single particular link.

23. A traction device as claimed in claim 17 in which:

(a) the plurality of weld beads include weld beads extending between each face of the tongue and opposite portions of each side portion of the particular link.

24. A device as claimed in claim 17, in which:

(a) the side edges of the tongue are spaced from the adjacent arcuate end portions of the said particular link by clearances greater than thickness of an arcuate end portion of an adjacent link interconnected directly to the particular link to permit hinging of the adjacent links with respect to the particular link.

25. A device as claimed in claim 17, in which:

(a) each tongue is located symmetrically with respect to the central portion of the cross member.

26. A device as claimed in claim 17, further including a chain connector link for connecting together opposite ends of each length of chain, each chain connector link comprising:

(a) a pair of generally parallel side portions interconnected by a pair of generally arcuate end portions to define a periphery of the connector link, one side portion of the connector link having an obliquely inclined slot therein, the slot being defined by obliquely disposed, oppositely facing generally plane end faces defining opposed ends of the said one side portion, a perpendicular distance between the plane end faces being sufficient to admit a portion of one other link to pass therethrough when the portion of the said one other link is disposed so as to be generally parallel to at least one plane end face of the side portions.

* * * * *